United States Patent [19]
Lawler

[11] Patent Number: 5,758,259
[45] Date of Patent: May 26, 1998

[54] AUTOMATED SELECTIVE PROGRAMMING GUIDE

[75] Inventor: Frank A. Lawler, Seattle, Wash.

[73] Assignee: Microsoft Corporation, Redmond, Wash.

[21] Appl. No.: 828,814

[22] Filed: Mar. 11, 1997

Related U.S. Application Data

[63] Continuation of Ser. No. 521,361, Aug. 31, 1995, abandoned.

[51] Int. Cl.$^6$ .................................................. H04N 5/445
[52] U.S. Cl. ........................ 455/5.1; 345/906; 345/563; 345/12
[58] Field of Search ........................ 346/6, 7, 12, 13, 346/906, 553, 563, 564, 569, 570

[56] References Cited

U.S. PATENT DOCUMENTS

| | | | |
|---|---|---|---|
| 5,477,262 | 12/1995 | Banker et al. | 348/7 |
| 5,479,266 | 12/1995 | Young et al. | 358/335 |
| 5,479,268 | 12/1995 | Young et al. | 358/335 |

FOREIGN PATENT DOCUMENTS

9414284  6/1994  WIPO .......................... H04N 7/16

*Primary Examiner*—John K. Peng
*Assistant Examiner*—Nathan J. Flynn
*Attorney, Agent, or Firm*—Klarquist Sparkman Cambell Leigh & Whinston, LLP

[57] ABSTRACT

This method includes a method of identifying for a selected viewer a preferred program available from an interactive television or televideo (IT) system at a selected time. The IT system establishes for each viewer a database or table of viewer preferences representing the particular characteristics of programming previously delivered to the viewer. The IT system compares the particular characteristics in the viewer preference table to predetermined characteristics of video programming available at the selected time. The IT system determines for the video programming available at the selected time degrees of correlation to the predetermined characteristics in the viewer preference table. The IT system identifies as the preferred program the video programming available at the selected time having a greatest degree of correlation.

18 Claims, 6 Drawing Sheets

AUTOMATED SELECTIVE PROGRAMMING GUIDE

This application is a continuation of Application No. 08/521,361, filed on Aug. 31, 1995 now abandoned.

FIELD OF THE INVENTION

The present invention relates to interactive television or televideo systems and, in particular, to a method of providing viewers with personalized guides to programming available on such systems.

BACKGROUND OF THE INVENTION

Conventional cable and satellite television transmission is evolving into interactive television or televideo (IT) systems. IT systems combine the video broadcast capability characteristic of conventional broadcast television with computer-executed applications or programming responsive to input from viewers. By some estimates, IT systems under development could include the equivalent of 500 channels of programming, including video broadcasting and applications.

Meaningful access to large amounts of interactive televideo programming will require that viewers be able to sift through vast amounts of programming and scheduling information. Conventional printed programming guides, such as T.V. Guide magazine or local newspapers, already provide only incomplete programming information for cable television networks with as few as 50 channels. It is expected that complete printed programming guides for the large amounts of programming in IT systems would be very large and expensive and unacceptably cumbersome.

Some conventional cable television networks dedicate a channel to a programming guide service, such as the Prevue Channel service provided by Prevue Networks, Inc. or the TV Guide OnScreen service. This conventional type of programming service lists the titles of programs scheduled for selected times. Typically, the titles of programs scheduled for about four television channels over a period of about two hours are listed simultaneously.

The service automatically scrolls through most or all of the channels available on the cable television network and automatically shifts the two-hour scheduling period shown according to the actual time. The same program schedule is delivered to all viewers on the cable television network. Viewers passively view the program schedule as it is scrolled.

Conventional cable television program guide services provide only one programming guide for all viewers or subscribers to a network. In an IT system with a wide range of programming, it is expected that individual viewers will prefer selected subsets of the available programming. Under these circumstances, repeatedly requiring viewers to select a subset of programming from a single massive programming guide would be a burden on viewers and a barrier to full utilization of an IT system.

SUMMARY OF THE INVENTION

The present invention includes a method of identifying for a viewer selective programming on an interactive television or televideo (IT) system. The IT system includes a central control node that delivers programming to multiple subscribers or viewers. Each viewer has a video display set (e.g., a television receiver) and an associated interactive controller in communication with the central control node and that is responsive to input from the viewer for controlling programming on the video display set.

With reference to a preferred embodiment, the method of this invention includes identifying for a selected viewer a preferred program available from the IT system at a selected time. The preferred program and criteria for identifying the preferred program are selected automatically. As a result, the method of identifying the preferred programming is transparent to, and requires no explicit selection by, the viewer.

In operation, the IT system identifies particular characteristics of programming delivered to the selected viewer. With reference to a motion picture, for example, the particular characteristics could include the names of the director and leading actors and the genre of the motion picture (e.g., science fiction, romance, or comedy). The IT system establishes for each viewer a database or table of viewer preferences representing the particular characteristics of programming previously delivered to the viewer (i.e., a viewing history for the viewer).

Whenever a viewer requests a listing of preferred programming for a selected time, the IT system compares the particular characteristics in the viewer preference table to the predetermined characteristics of programming available at the selected time. The IT system determines for the programming available at the selected time degrees of correlation to the predetermined characteristics in the viewer preference table. The programming available at the selected time having a greatest degree of correlation is identified as the preferred program.

This invention provides a viewer on an IT system with a programming guide that is automatically personalized based on the viewing history of the viewer. The invention requires no prior selection of programming types or classes by the viewer. As a result, this invention can dramatically reduce the programming information a viewer must consider to identify appropriate programming selections.

In addition to preferred programming based on an individual's viewing history, this invention can identify preferred programming according to the viewing histories of any selected group of viewers. Preferred programming can be identified based upon the viewing history of viewers at an IT system subscriber location (e.g., a home) or in an IT system region (e.g., locale or nation) or demographic group.

The foregoing and other features and advantages of preferred embodiments of the present invention will be more readily apparent from the following detailed description, which proceeds with reference to the accompanying drawings.

DETAILED DESCRIPTION OF PREFERRED EMBODIMENTS

Figure 1:
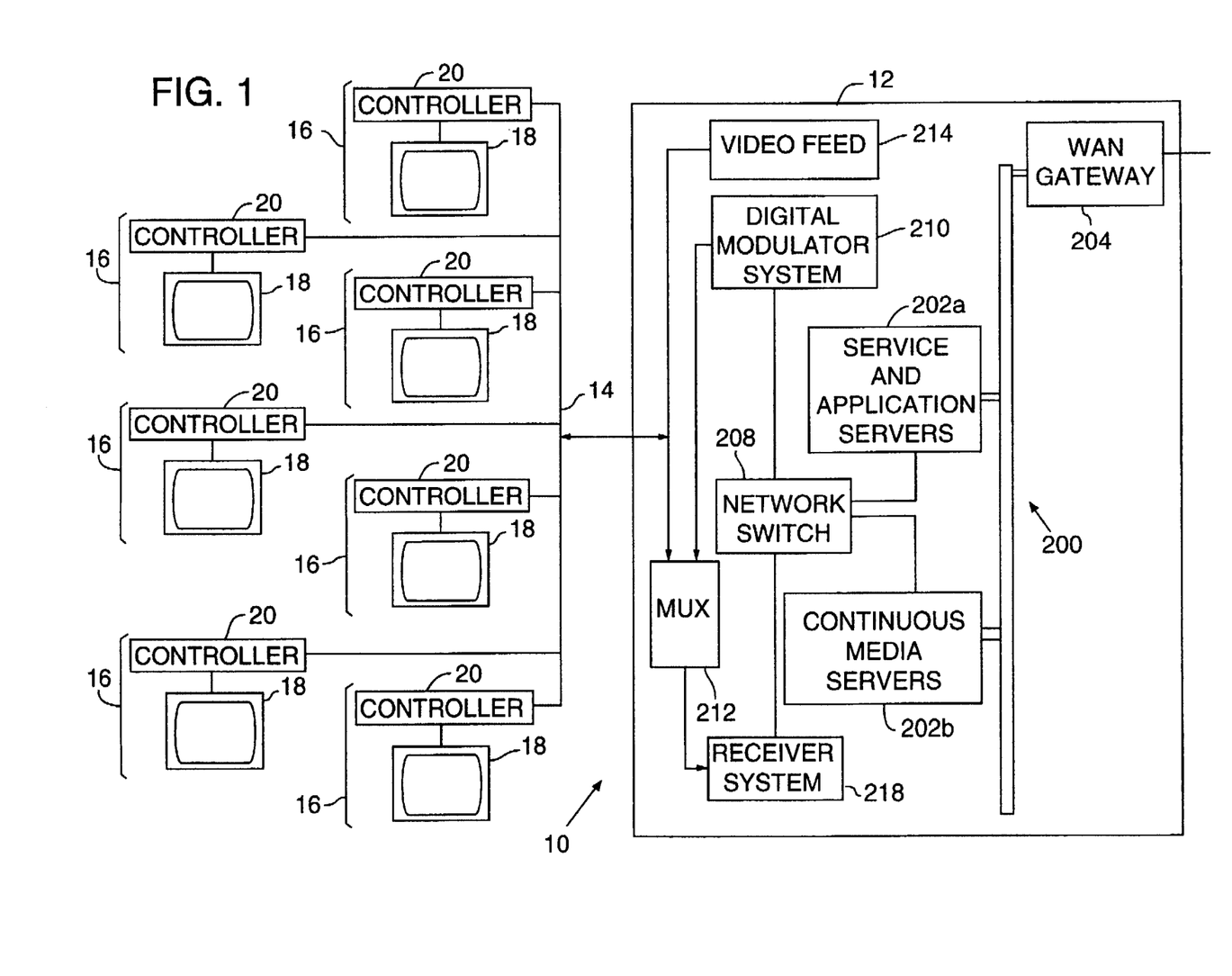
FIG. 1 is a block diagram of an interactive television system used for the preferred embodiment of this invention.
Figure 2:
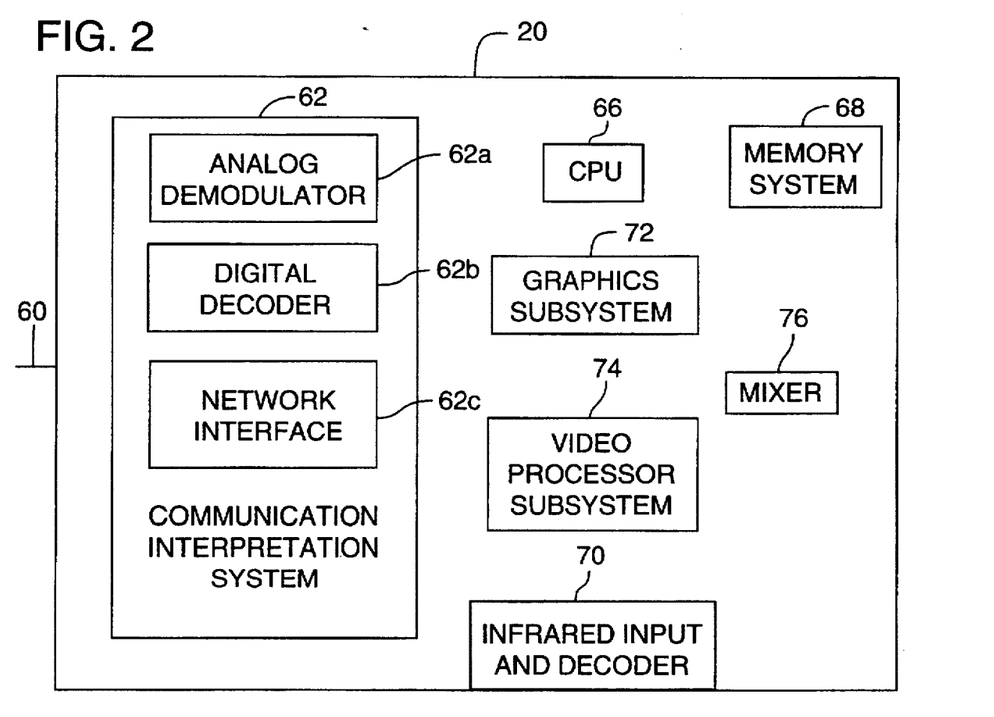
FIG. 2 is a block diagram of an interactive station controller used for the preferred embodiment of this invention.

FIGS. 1 and 2 are directed to an interactive television or televideo (IT) system 10 as an operating environment for preferred embodiments of the present invention. For purposes of simplicity and clarity, IT system 10 is described with reference to widely available systems and standards, including conventional analog television receivers and cable-based video networks.

It will be appreciated, however, that the particular components of IT system 10 may be implemented with a variety of conventions, standards, or technologies without departing from the underlying concepts of the present invention. The term televideo is used to emphasize the applicability of this invention beyond standard television-based systems. As two examples, the conventional analog television receivers and cable-based video network referred to in FIGS. 1 and 2 could be implemented as digital video receivers and a satellite downlink transmission system, respectively.

FIG. 1 is a simplified block diagram of an interactive televideo (IT) system 10 having a central control node 12 that transmits programming over a network 14 to multiple viewer stations (e.g., homes) 16. The programming may include standard analog video broadcasts (e.g., NTSC, PAL or SECAM), digital or digitally encoded video broadcasts (e.g., MPEG1 or MPEG2), or digital information related to computer-executed applications.

Each viewer station 16 includes at least one video display set 18 (e.g., a television receiver) and an interactive station controller 20, which is sometimes referred to as a set-top box. Although it is shown distinct from video display set 18, interactive station controller 20 could alternatively be integral with video display set 18.

Interactive station controllers 20 receive programming from central control node 12 and control the associated video display sets 18 in accordance with the programming. Controlling video display set 18 of a conventional analog type may include, for example, delivering an analog video signal directly to video display set 18 for display, converting a digital video signal to a suitable analog form for display, or executing a computer application that includes displays on display set 18.

Interactive station controllers 20 transmit digital information to and receive digital information from central control node 12. The digital information typically relates to applications executed by processors residing at control node 12 and station controller 20.

Preferably, network 14 carries bidirectional communication between station controllers 20 and central control node 12. Alternatively, communication between station controllers 20 and central control node 12 can be carried by different communication systems. For example, programming from central control node 12 to station controllers 20 could be carried on a satellite downlink while station controllers 20 send information to central control mode 12 on a terrestrial modem link. An exemplary embodiment of central control node 12 is described in greater detail below.

FIG. 2 is a simplified block diagram of an exemplary one of interactive station controllers 20 for controlling video display set 18 and communicating with central control node 12. Station controller 20 includes a terminal 60 that delivers communication or information from central control node 12 to a communication interpretation system 62 having, for example, an analog television demodulator 62a, a digital video decoder 62b, and a digital network communication interface 62c.

Demodulator 62a functions as a conventional television tuner for selecting one of multiple conventional analog video signals received from central control node 12 at input 60. Video decoder 62b functions as a digital equivalent of demodulator 62a for selecting one of multiple digital video signals received at input 60 from central control mode 12. Network communication interface 62c communicates with central control node 12 with digital information carried over baseband frequencies. The baseband frequencies may be below the conventional analog video signal frequencies, above the digital video signal frequencies, or between the frequencies of analog or digital video signals.

A central processing unit (CPU) 66 in conjunction with a memory system 68 controls operation of station controller 20. CPU 66 is responsive to an infrared receiver and decoder system 70 that receives user input from a hand-held viewer control unit 71 (FIG. 4) and delivers the input to CPU 66. For example, CPU 66 controls selection of analog- or digital-based programming or applications delivered from central control node 12, accesses, activates, or executes selected applications, or delivers information to or requests information from central control node 12.

A graphics subsystem 72 is controlled by CPU 66 to form graphics images, including interactive system user interface images, on video display set 18. A video processor subsystem 74, also controlled by CPU 66, provides control in the rendering of video imagery, including decompressing digital video signals and sizing and positioning a video display window.

A mixer 76 receives a video display signal from video processor subsystem 74 and graphics image signals from graphics subsystem 70 and delivers a mixed image signal to video display set 18. Mixer 76 provides compositing, masking and blending of display signals from two or more image sources such as, for example, a digital video signal and locally-generated graphics or an analog video signal and a bitmap image received from central control node 12.

Figure 3A:
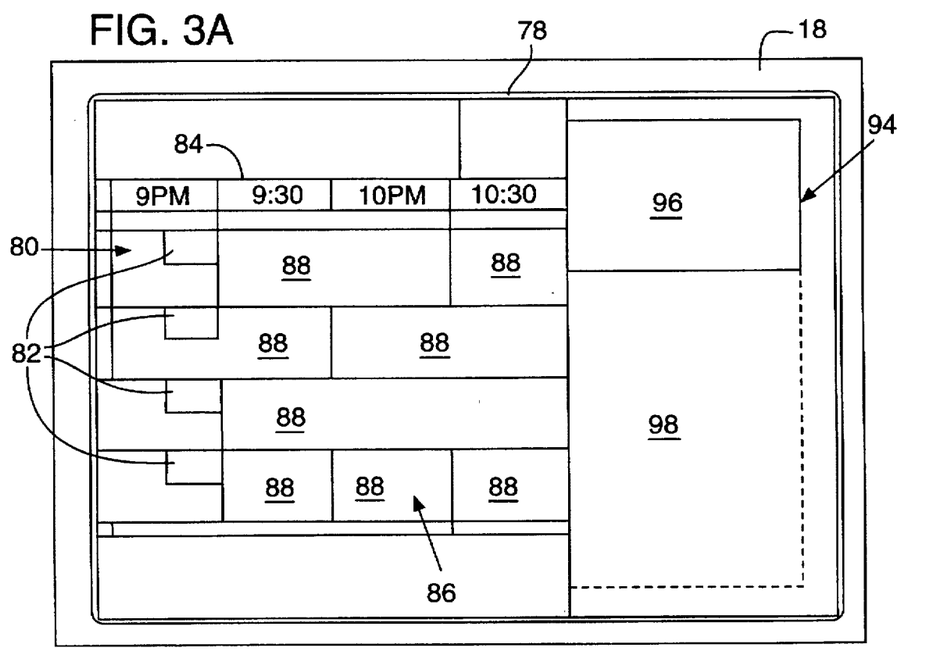
FIGS. 3A and 3B are respective block and stylized diagrams of a video display screen with a personalized programming guide of the present invention.
Figure 3B:
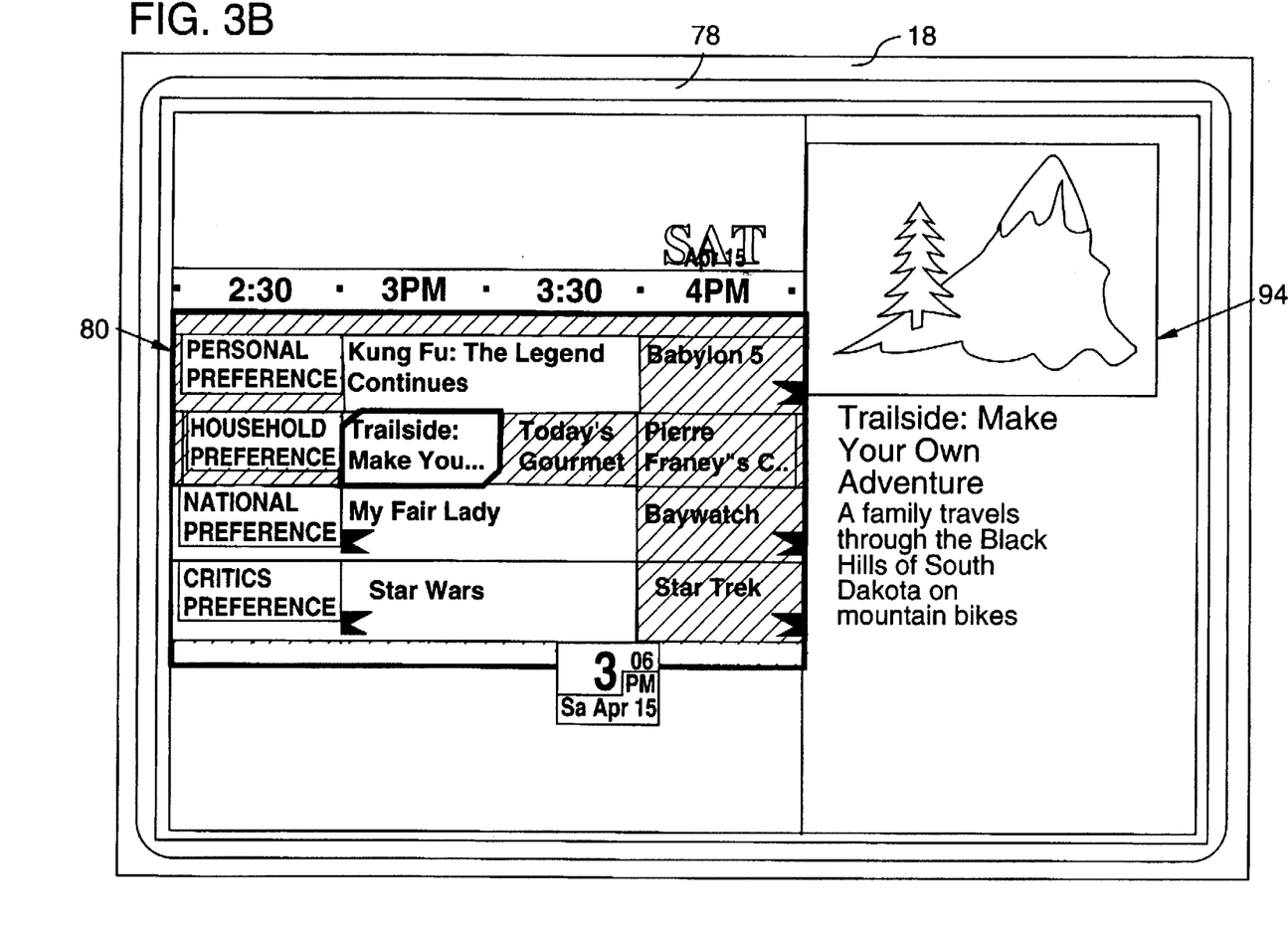

FIGS. 3A and 3B show a display screen 78 of one of video display sets 18 with a selective programming guide 80 of the present invention rendered thereon. Selective programming guide 80 displays for a viewer preferred programming available on a date and at a time selected by the viewer. The preferred programming may be selected according to one or more different criteria.

Selective programming guide 80 includes a criteria panel 82 identifying multiple different criteria (e.g., personalized, household, national, or critical) for selecting preferred programming, a time panel 84 listing particular times (e.g., a two hour time period in 30 minute increments), and a program grid 86 of program tiles 88 listing titles of programming selected according to the identified criteria at the listed times.

Figure 4:
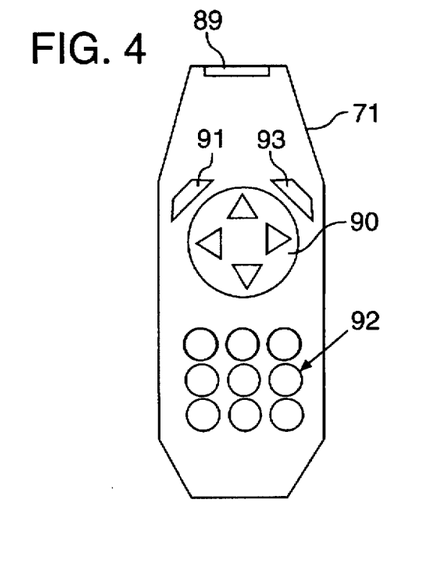
FIG. 4 is a plan diagram of a viewer control unit for providing viewer input to the interactive station controller of FIG. 2.

Referring to FIG. 4, viewer control unit 71 includes an infrared transmitter window 89 through which control unit 71 emits infrared signals to infrared input 70 of station controller 20. A directional control keypad 90 allows a viewer to transmit signals for moving a cursor (i.e., an indication of position) between tiles 88 on selective programming guide 80.

The cursor may be rendered on display screen 78 as a graphic character or icon or by changing the graphic characteristics of the program tile 88 where the cursor is positioned. The programming identified in a program tile 88 to which a viewer moves the cursor indication is referred to as being focused upon by the viewer or as focussed programming. The viewer may initiate or activate selections by depressing an action key 91, may enter numeric values with numeric key pad 92, and may access a programming guide selection menu by depressing a menu key 93.

Interactive station controller 20 preferably generates a program summary panel 94 adjacent selective programming guide 80 for programming focused upon by a viewer. Program summary panel 94 includes a preview display window 96 within which interactive station controller 20 renders display imagery relating the focussed programming. The display imagery may include currently available video programming, an on-demand video clip or segment, or a still image, as well as an associated audio segment. A text description window 98 displays a program title (preferably of a distinct font), a text description of the program, and one or more information icons relating to selected characteristics of the programming.

Figure 3C:
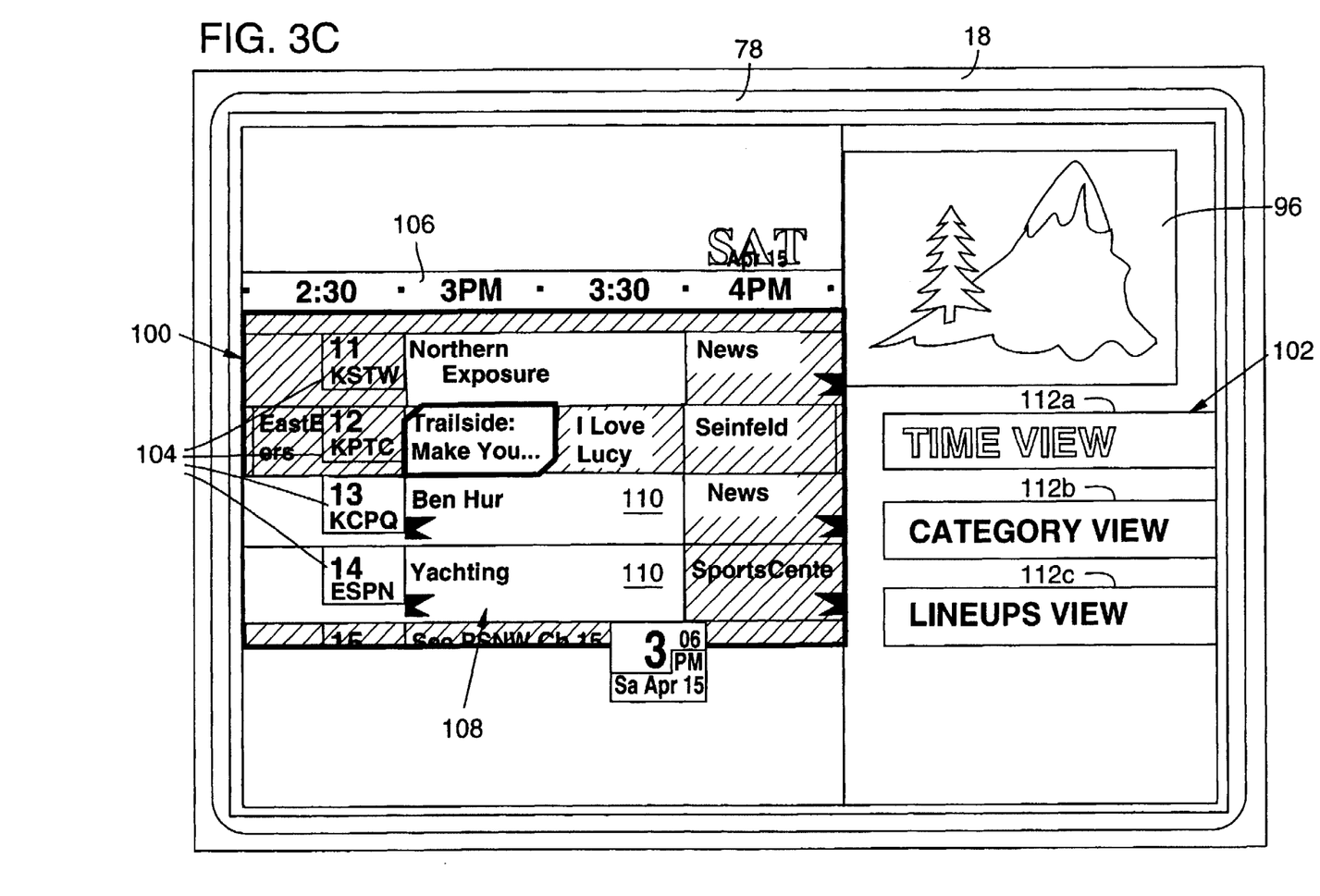
FIG. 3C is a stylized diagram of a video display screen with a programming guide and a programming guide selection menu.

FIG. 3C shows a display screen 78 of one of video display sets 18 with a time-based programming guide 100 and a programming guide selection menu 102 rendered thereon. Time guide 100 displays for a viewer programming available on a subset of IT system channels over a particular time period. Time guide 100 includes a channel panel 104 identifying multiple particular channels or services (e.g., four channels or services), a time panel 106 listing particular times (e.g., a two hour time period in 30 minute increments), and a program grid 108 of program tiles 110 listing titles of programming on the identified channels at the listed times.

Programming guide selection menu 102 is rendered adjacent program guide 100 and includes programming guide selection blocks 112 corresponding to available programming guides. A time view selection block 112a corresponds to time guide 100, a category view selection block 112b corresponds to a programming guide that lists available programs by category, and a lineups view selection block 112c activates selected programming guide 80 of the present invention.

As shown in FIG. 3C, the title for time view selection block 112a is rendered differently from the titles of selection blocks 112b and 112c to indicate that time guide 100 is currently displayed. Selective programming guide 80 of this invention is accessed when a viewer moves a cursor to lineups view block 112c and depresses action key 91. Programming guide selection menu 102 is shown positioned below preview display window 96 of program summary panel 94. It will be appreciated that this position of selection menu 102 is preferred, but that menu 102 could alternatively be rendered at virtually any position on display screen 78.

Figure 5:
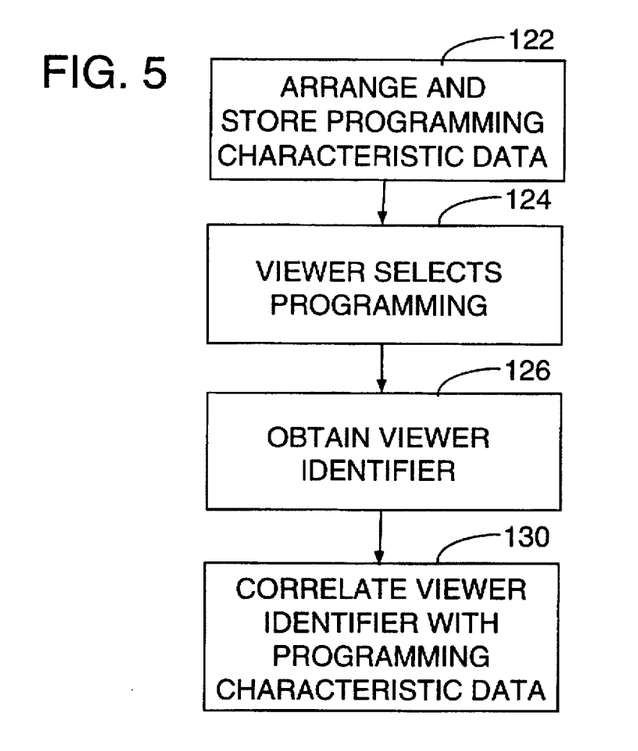
FIG. 5 is a flow diagram of a method of identifying predetermined characteristics of programming that a viewer receives from the interactive television system of FIG. 1.

FIG. 5 is a flow diagram showing a method of identifying predetermined characteristics of programming that a particular viewer receives from IT system 10. This method provides a viewer preferences database of the characteristics of programming the viewer selects or receives. The viewer preferences database represents a viewing history that forms a basis for identifying future preferred programming for the viewer.

More specifically, most viewers have relatively regular viewing habits. Determining a viewing history for a viewer will highlight such habits. To the extent the viewing habits of a viewer remain unchanged, a viewing history can provide a relatively accurate basis for predicting or selecting the future programming that the viewer would prefer to receive.

Process block 122 indicates that programming data representing predetermined characteristics of programming scheduled for transmission over IT system 10 is stored in central control node 12. The predetermined characteristics can include, for example, programming type (e.g., movie, talk show, sports, or series) as well as data regarding selected fields for each programming type. Such information is commercially available, for example, from Tribune Media Services or TV Data, both of Albany, N.Y.

The programming data preferably is arranged as an electronic programming guide (EPG) database that includes: an episode table of data representing selected characteristics of each interactive or broadcast televideo episode, a series table of data representing selected characteristics of each interactive or broadcast televideo series, a genre table of data representing program genres and optionally a subgenre table of data representing programming subgenres, and a template table of programming characteristic template data identifying selected fields of data for each program.

The selected characteristics for each program are assigned to selected categories, including a program type or class category (e.g., movie, sports, talk show, series). A criteria template is defined for each type of class of program. The criteria template defines selected fields of programming characteristics to be selected from the programming data for a particular type or class of programming. Tables 1A–1D represent exemplary criteria templates for the respective program types Movie, Sports, Talk Show, Series.

Table 1A lists as an example programming characteristics for the movie Star Wars. Table 1B lists as an example the program characteristics for a baseball game between the Toronto Blue Jays and the Boston Red Sox. Table 1C lists as an example the program characteristics of a talk show hosted by David Letterman and having guests Jack Hanna and Mike Myers. Table 1D lists as an example the program characteristics for the television series M*A*S*H.

TABLE 1A

Movie Criteria Template

| Criterion Type | Criterion Field | Value (for selected program) |
|---|---|---|
| Name | Director | George Lucas |
| Name | cast1 | Mark Hamill |
| Name | cast2 | Carrie Fisher |
| Name | cast3 | Harrison Ford |
| Genre | Genre | Science Fiction |

TABLE 1B

Sports Criteria Template

| Criterion Type | Criterion Field | Value (for selected program) |
|---|---|---|
| Genre | Genre | Sports |
| Subgenre | Subgenre | Baseball |
| Team | Home | Toronto Blue Jays |
| Team | Visitor | Boston Red Sox |

TABLE 1C

Talk Show Criteria Template

| Criterion Type | Criterion Field | Value (for selected program) |
|---|---|---|
| Genre | Genre | Talk |
| Name | cast1* | David Letterman |
| Name | cast2* | Jack Hanna |
| Name | cast3* | Mike Myers |
| Subgenre | Subgenre | Comedy |

TABLE 1D

Series Criteria Template

| Criterion Type | Criterion Field | Value (for selected program) |
|---|---|---|
| Genre | Genre | Comedy |
| Name | cast1 | Alan Alda |
| Name | cast2 | Mike Farrell |
| Name | cast3 | Harry Morgan |
| Subgenre | Subgenre | Situation |

Within the EPG database, each programming event or episode record is linked to a parent series record. One-time programming events or specials have a single episode record linked to a single series record. Each episode record can have pointers to a genre table and optionally a subgenre table. If no pointers to programming characteristics are associated with an episode, the programming is correlated with the corresponding series record in the series table. Any pointers to series-specific programming characteristics are tracked and the corresponding information is retrieved.

Process block 124 indicates that a viewer at a selected viewer station 16 tunes to or selects televideo programming available from IT system 10. If multiple regular viewers are located (e.g., reside) at the selected viewer station 16, the viewer or viewers watching the programming each enter a personal identification number (PIN) into station controller 20 with viewer control unit 71. Station controller 20 associates each PIN with a particular viewer identifier.

Process block 126 indicates that station controller 20 transmits to central control node 12 a viewer identifier corresponding to the viewer or viewers watching the programming. Preferably, station controller 20 transmits the viewer identifier only if the selected programming has been selected by the viewer or viewers for more than a minimum threshold amount of time. For purposes of simplicity, the remaining description of this method will be made with reference to a single viewer, but is similarly applicable to each of multiple viewers.

Process block 130 indicates that central control node 12 correlates the viewer identifier with the predetermined characteristics of the programming delivered to the viewer. The correlation of programming characteristics with a viewer results in a viewer preference table of the selected characteristics of televideo programming previously delivered to the selected viewer. The viewer preference table for the viewer is stored in central control node 12.

Table 2 represents an exemplary viewer preferences table of the selected characteristics of programming previously delivered to the viewer. Table 2 shows that the viewer preference database for the selected viewer correlates the criteria "Name," "Genre," "Subgenre," and "Team" for programs the viewer has received with the values or predetermined characteristics of the programs and a count, for each value, of the number of received programs matching the value (e.g., name).

TABLE 2

Personal Favorites Profile (Example)

| Criterion | Value | Count |
|---|---|---|
| Name | Tim Allen | 27 |
| | Roseanne Barr | 42 |
| | Harrison Ford | 9 |
| | George Lucas | 5 |
| | David Letterman | 54 |
| | Alan Alda | 30 |
| | Peter Jennings | 78 |
| | Billy Crystal | 4 |
| | Don Adams | 10 |
| | David Lynch | 5 |
| | William Shatner | 10 |
| | Leonard Nimoy | 10 |
| Genre | Science Fiction | 10 |
| | Talk | 54 |
| | Romance | 4 |
| | News | 78 |
| | Comedy | 50 |
| | Sports | 28 |
| Subgenre | Business | 2 |
| | Comedy | 8 |
| | Adventure | 4 |
| | Baseball | 20 |
| | Football | 8 |
| Team | Boston Red Sox | 10 |
| | Toronto Blue Jays | 8 |
| | Dallas Cowboys | 4 |
| | Seattle Seahawks | 2 |
| | Cleveland Indians | 2 |
| | California Angels | 3 |

Preferably, each of the criteria will have associated with it a maximum number of values. For example, the name criterion could include 50 values, and the genre, subgenre, and team criteria could each include 10 values. In this regard, the value listings can be maintained as memory stacks of decreasingly recent values. The value in the memory stack with the lowest count is dropped with the addition of each new value. Alternatively, the least recent value in the memory stack is dropped with the addition of each new value.

Figure 6:
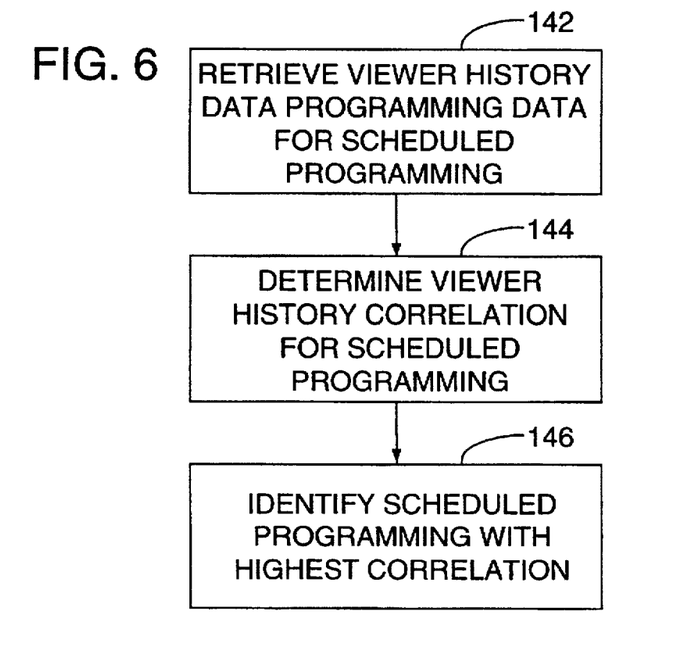
FIG. 6 is a flow diagram of a method of generating a personalized programming guide according to the present invention.

FIG. 6 is a flow diagram showing a method of identifying for a particular viewer preferred programming available from IT system 10 at a selected time period. This method selects the programming available from IT system 10 at the selected time most related to the viewer preferences database formed in accordance with the method of FIG. 5.

Process block 142 indicates that central control node 12 retrieves viewer history data from the viewer preference database and programming data representing the predetermined characteristics of television programming scheduled for delivery at one or more times.

The process block 144 indicates that the data representing scheduled programming data are compared against the viewer history data to determine a viewer history correlation for each scheduled program. In a preferred embodiment, the viewer history correlation for each program is determined as a sum of the counts in the viewer preference table for the values or characteristics included in the scheduled programs.

As an example, two programs are scheduled for a selected time. The first program is a talk show hosted by David Letterman with guests Tim Allen and Roseanne Barr. The other program is a news broadcast by Peter Jennings. Based upon exemplary Table 2, process block 144 would determine a viewer history correlation of 185 for the David Letterman talk show. This viewer history correlation would be determined as the sum of the counts 27, 42, and 54 for values or names Tim Allen, Roseanne Barr, and David Letterman, the count 54 for the value or genre "talk", and the count 8 for the value or subgenre comedy.

Process block 144 would determine a viewer history correlation of 156 for the Peter Jennings newscast. This viewer history represents the sum of the count 78 for the Peter Jennings name criterion and the count of 78 for the news genre.

Process block 146 indicates that the program scheduled for delivery at the selected time and having the highest correlation is identified as the preferred program. Based on the viewer history correlations determined for the two exemplary programs discussed with reference to process block 144, process block 146 would identify the David Letterman talk show as the preferred program for the viewer.

Preferably, the viewer preference correlations would be determined periodically by central control node 12. For example, central control node 12 could perform all such determination in a batch format daily or weekly at a relatively low-use time. Preferred programming is retrieved from memory and displayed for a viewer when the viewer selects or focuses upon a program tile 88 of selective programming guide 80.

More frequent determinations of viewer preference correlations would provide greater accuracy in identified preferred programming. For example, viewer preferences could be determined only when a viewer selects a program tile 88 of selective programming guide 80. However, increased frequency of the determinations would impose a correspondingly increased burden on the IT system processing resources.

The embodiment described above identifies preferred programming according to an individual viewer's viewing history. It will be appreciated that the method of this invention could be used to identify preferred programming according to the viewing histories of all viewers within a household (e.g., household preferred programming) or any other aggregate of viewers (e.g., national preferred programming). Similarly, preferred programming could be determined by aggregating editorial writings by critics. In accordance with such capabilities, FIG. 3B shows selective programming guide 80 with criteria panel 82 listing four separate preference criteria reflecting individual viewing history, household viewing history, aggregate (national) viewing history, and aggregate critical reviews.

Accumulation of viewer history information according to the method of FIG. 5 provides increased accuracy in identifying preferred programming according to individual viewing histories. However, the viewer preference correlation of all programs within a selected time period could be the same or fall within a threshold percentage of the average correlation of all shows, particularly if the viewer history is initially being assembled. Under such circumstances, any preference selection would be based upon insignificant preference differences. In such circumstances, viewer preference histories of other viewers with similar viewing histories could be retrieved and used to identify preferred programs for a selected time.

For example, the viewer preference database of a first viewer could indicate a high interest in the science fiction genre, but no programs at a time period selected by the first viewer match that genre. In accordance with the present invention, viewing preferences of other viewers having a high preference for the science fiction genre could be polled to identify a peer preference. Such a peer preference query provides for the first viewer an estimation of preferred programming when the viewing history of that viewer is unavailable or insignificant.

Viewer preference data is of greatest accuracy when the identification of viewers receiving programming is correct. For example, the viewing history of a viewer could not be determined if the viewer did not enter his PIN or did not view a program after entering the PIN, as described with reference to process block 124. To improve the accuracy with which a viewer history is determined, viewers identified as receiving a program may be periodically polled or queried during the program. For example, a small query icon rendered at a bottom corner of the display screen during the program could prompt the viewer to acknowledge his presence. Absence of an action from a viewer would end the tracking of the program as one being received by the viewer.

The programming characteristics referred to above relate primarily to programming subject matter. In addition, programming characteristics other than subject matter could be used in accordance with this invention. Such additional characteristics, could include whether the programming supports closed captioning for the hearing impaired, critical star ratings of the relative quality of a program, or an audience rating (e.g., viewer suitability ratings). These additional characteristics could be accorded the same weight as the subject matter characteristics or could function as "tiebreakers" between programs with similar correlation levels.

Referring to FIG. 1 central control node 12 includes a digital local area network (LAN) 200 with multiple computer servers 202 for performing various interactive system applications or functions. Servers 202 include, for example, multiple state-of-the art microprocessors that operate in parallel and access or control data storage devices with large data capacities. A digital communication gateway 204 couples LAN 200 to a wide area network (WAN) (not shown) for obtaining and delivering IT system information. For example, central control node 12 receives programming data representing the predetermined characteristics of scheduled programming at gateway 204.

Servers 202 may include, for example, service and application servers 202a and continuous media servers 202b. Service and application servers 202a process interactive service requests from subscribers and provide services and applications associated with operation of IT system 10. Service and application servers 202a may be dedicated to particular applications such as an electronic programming guide for viewers, network security, monitoring, object storage, financial transactions, data access, and other administration functions.

Continuous media servers 202b provide storage and on-demand or near on-demand delivery of digitized video information. The digitized video information can include video programming of substantially any duration ranging from individual image frames and brief video clips to full-length motion pictures.

Servers 202 communicate with station controllers 12 via a network communication switch 208, such as an asynchronous transfer mode (ATM) switch. For communication from servers 202 to station controllers 20, network communication switch 208 arranges digital information received from servers 202 in a standard bidirectional digital communication format for transmission over network 14. For communication from station controllers 12 to servers 202, network communication switch 208 converts digital information from the standard bidirectional digital communication format for delivery to servers 202.

Digital information from servers 202 is frequency modulated by a digital modulator system 210 for transmission over network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequency range.

A multiplexing system 212 receives and mixes the frequency modulated digital information from modulator system 210 and standard analog video signals obtained from a standard analog video feed 214 and delivers an IT composite signal to interactive network 14. Analog video feed may be or include a satellite downlink, a cable receiver, or any locally generated programming. A reverse channel receiver system 218 receives and demodulates digital communications from station controller 20 for processing by servers 202.

Having illustrated and described the principles of the present invention in a preferred embodiment, it should be apparent to those skilled in the art that the embodiment can be modified in arrangement and detail without departing from such principles. Accordingly, I claim as my invention all such embodiments as come within the scope and spirit of the following claims and equivalents thereto.

I claim:

1. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a method of identifying for a selected viewer a preferred program available at a selected time, comprising:

identifying automatically predetermined content characteristics of programming delivered to the selected viewer;

identifying automatically predetermined content characteristics of programming available at the selected time;

classifying the programming delivered to the selected viewer within one of plural programming categories that each has associated with it plural predetermined content characteristics, the plural programming categories including at least a movie programming category, a series programming category, and a sports programming category corresponding to movie programming, series programming, and sports programming, respectively;

identifying the plural predetermined content characteristics associated with the programming category from a characteristic template corresponding to the programming category, the characteristic templates for the movie programming and series programming categories each including a name type for a name of a person associated with the respective movie and series programming and the characteristic template for the sports programming category including a name type for a name of a sporting entity associated with the sports programming;

determining degrees of correlation between the predetermined content characteristics of programming delivered to the selected viewer and the predetermined content characteristics of programming available at the selected time; and identifying as the preferred program the programming available at the selected time having a greatest degree of correlation.

2. The method of claim 1 in which at least a selected one of the steps is computer-executed within the central control node.

3. The method of claim 2 in which plural steps are computer-executed within the central control node, including identifying predetermined content characteristics of programming available at the selected time and determining degrees of correlation between the predetermined content characteristics of programming delivered to the selected viewer and the predetermined content characteristics of programming available at the selected time.

4. The method of claim 1 further comprising communicating to the selected viewer the preferred program available at the selected time.

5. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a method of identifying predetermined characteristics of selected programming delivered to a selected viewer at a selected viewer station, comprising:

delivering selected programming to the selected viewer station;

identifying automatically predetermined content characteristics of programming delivered to the selected viewer station;

transmitting to the central control node from the interactive station controller of the selected viewer station a selected viewer identifier corresponding to the selected viewer; and recording at the central control node the predetermined content characteristics of the selected programming delivered to the selected viewer;

classifying the programming delivered to the selected viewer within one of plural programming categories that each has associated with it selected ones of plural predetermined content characteristics;

identifying the selected ones of the predetermined content characteristics associated with the programming category from a characteristic template corresponding to the programming category, the characteristic template for each category including plural characteristic types representing plural content-related aspects of programming within the programming category; and identifying the selected ones of the predetermined content characteristics of the programming delivered to the selected viewer.

6. The method of claim 5 further comprising:

determining a viewing duration during which the selected programming is delivered to the selected viewer; and recording at the central control node the predetermined content characteristics of the selected programming delivered to the selected viewer whenever the viewing duration exceeds a predetermined threshold viewing duration.

7. The method of claim 5 in which the plural programming categories include a movie programming category, a sports programming category, and a news programming category.

8. The method of claim 5 in which the predetermined programming content characteristics of selected characteristic templates include a names field listing names of persons who are involved in producing the programming, but who do not appear in the programming.

9. In an interactive televideo system having a central control node in bidirectional communication with plural viewer stations that include video display sets operably coupled to interactive station controllers, the central control node delivering programming over multiple channels to the plural viewer stations and receiving information from the interactive station controllers, a method of identifying predetermined content characteristics of selected programming delivered to a selected viewer at a selected viewer station, comprising:

storing programming data in a memory associated with the interactive televideo system, the programming data representing predetermined content characteristics of programming for delivery to the selected viewer station;

storing in the memory programming characteristic template data representing programming content characteristics of plural programming categories;

identifying programming delivered to the selected viewer;

associating automatically the programming delivered to the selected viewer with a corresponding programming category;

retrieving from the memory programming characteristic template data representing the programming content characteristics of the corresponding programming category; and retrieving from the memory the programming data corresponding to the programming content characteristics represented by the programming characteristic template data for the programming delivered to the selected viewer.

10. The method of claim 9 further comprising storing in the memory as viewer history data the programming data corresponding to the programming characteristics represented by the programming characteristic template data for the programming delivered to the selected viewer.

11. The method of claim 9 in which the memory resides in the central control node.

12. In an interactive televideo system having a central control node in bidirectional communication with plural viewer stations that include video display sets operably coupled to interactive station controllers, the central control node delivering programming over multiple channels to the plural viewer stations, including selected programming delivered to a selected viewer at a selected viewer station, and receiving information from the interactive station controllers, a memory associated with the central control node, comprising:

viewer history data stored in the memory and representing predetermined content characteristics of programming delivered to the selected viewer at the selected viewer station; and programming classification data stored in the memory and representing programming category classifications of the programming delivered to the selected viewer at the selected viewer station, each classification having associated with it selected ones of plural predetermined content characteristics representing plural content-related aspects of the programming delivered to the selected viewer.

13. The memory of claim 12 in which the programming category classifications stored in the memory include a movie programming category, a sports programming category, and a news programming category.

14. The method of claim 12 further comprising characteristic classification data stored in the memory and representing programming characteristic classifications of the predetermined characteristics of the programming delivered to the selected viewer at the selected viewer station.

15. The memory of claim 14 in which the characteristic classification data stored in the memory include at least one of a names category listing names of persons in the programming, a genre category listing programming genres, and a sports team category listing sports teams in the programming.

16. The method of claim 1 in which the plural programming categories further include a news programming category corresponding to news programming, a characteristic template for the news programming category including a name type for a name of a person associated with the news programming.

17. The method of claim 1 in which the names types included in the characteristic templates of the movie programming and series programming categories include names of persons who are involved in producing the programming, but who do not appear in the programming.

18. The method of claim 1 in which the characteristic templates include genre and subgenre types listing respective programming genres and subgenres for characterizing the subject matter of the programming.

* * * * *